United States Patent
Hayashi et al.

(12)
(10) Patent No.: US 6,340,453 B1
(45) Date of Patent: Jan. 22, 2002

(54) METHOD FOR PRODUCING NICKEL HYDROXIDE

(75) Inventors: Kiyoshi Hayashi; Nobuyasu Morishita; Munehisa Ikoma, all of Toyohashi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/613,754

(22) Filed: Jul. 11, 2000

(30) Foreign Application Priority Data

Jul. 16, 1999 (JP) .............................. 11-203805

(51) Int. Cl.[7] .................... C01G 53/00; C25B 1/00
(52) U.S. Cl. ...................... 423/592; 205/509
(58) Field of Search ................. 423/592; 205/509; 210/681

(56) References Cited

U.S. PATENT DOCUMENTS 4,265,718 A * 5/1981 Limare et al.
4,470,894 A * 9/1984 Dyer
5,545,392 A   8/1996 Babjak et al.
5,660,709 A * 8/1997 Bauer et al. ................. 205/344

FOREIGN PATENT DOCUMENTS

| EP | 000575093 A1 | * 12/1993 |
| EP | 0673882 | * 9/1995 |
| GB | 1080119 | * 8/1967 |
| JP | 8-34618 | 2/1996 |

* cited by examiner

Primary Examiner—Steven Bos
(74) Attorney, Agent, or Firm—McDermott, Will & Emery

(57) ABSTRACT

The instant specification discloses a method for producing nickel hydroxide from an aqueous solution containing an ammonium ion and dissolved nickel hydroxide in an alkaline state, which is characterized in that pH of the solution is controlled by supplying a hydroxide ion generated by water electrolysis thereto. The method of the invention is an environmentally friendly one for producing nickel hydroxide, which enables an easy control of physical properties of nickel hydroxide.

3 Claims, 1 Drawing Sheet

METHOD FOR PRODUCING NICKEL HYDROXIDE

BACKGROUND OF THE INVENTION

The present invention relates to a method for producing nickel (II) hydroxide from a powdered metallic nickel.

Nickel hydroxide is used for various industrial applications such as positive electrodes of alkaline storage batteries. This nickel hydroxide has been produced, for example, by adding sodium hydroxide and the like to a solution containing a nickel salt such as nickel sulfate, nickel chloride or nickel nitrate for alkalizing the solution and precipitating nickel hydroxide.

Such production method of nickel hydroxide has only a simple mechanism but requires a number of steps for carrying out the method. The use of sodium hydroxide for alkalizing a solution in a reaction vessel, particularly, produces sodium nitrate, sodium sulfate and the like as by-product, thereby necessitating removal of these substances in the form of a waste water out of a reaction system.

In order to solve this problem, a method in which nickel hydroxide is produced by dissolving nickel into an aqueous solution containing ammonium and/or an ammonium salt is disclosed in Japanese Laid-open Patent Publication Hei No. 8-34618.

According to this method, after the potential of the aqueous solution dissolving nickel reaches a reduction level, conversion of nickel into nickel hydroxide is facilitated by adding oxygen to precipitate nickel hydroxide.

The followings are reaction formulae representing generation of nickel hydroxide in this production method:

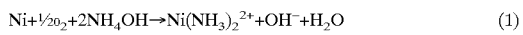  (1)

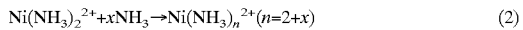  (2)

  (3)

Next, this method will be briefly explained, referring to each process in due order. (i) Addition and dissolution of a powdered nickel into an aqueous solution containing an ammonium ion In this step, a powdered nickel is added to the above-mentioned aqueous solution containing ammonium for activation and dissolution.

The aqueous solution containing an ammonium ion used here is a solution, which contains a free ammonium ion and can dissolve metallic nickel, so the solution may be used in this step contains at least an ammonium salt capable of supplying a free ammonium ion. As the ammonium salt, there are, for example, ammonium sulfate, ammonium acetate, ammonium chloride, ammonium formate and ammonium phosphate, which may be used alone or in an arbitrary combination of two or more. Among them, ammonium sulfate and ammonium acetate are preferably used because they are able to facilitate dissolution reaction.

Also, since reaction between ammonium salt and ammonium is reversible, the above-mentioned aqueous solution containing ammonium may only include a relatively low concentration of an ammonium salt. (ii) Supply of oxygen and application of negative potential to the above-mentioned aqueous solution In this step, a negative potential is given to the above-mentioned aqueous solution obtained by adding and dissolving the powdered nickel into the aqueous solution containing an ammonium ion, so that the potential of the aqueous solution can reach a reduction level to facilitate generation of nickel hydroxide upon supply of oxygen in the next step.

The potential of the aqueous solution to be applied may be −600 to −100 mV in consideration of the balance of Ni, $O_2$, $NH_3$ and $H_2SO_4$. Further, it is preferably −500 to −200 mV.

The temperature of the aqueous solution may be 20° C. or higher and simultaneously lower than the boiling point thereof, because lower temperatures than this range would lead to lower yields. Further, it is preferably 30° C. or higher and simultaneously lower than the boiling point thereof. In view of the energy efficiency, particularly, it is preferably 50 to 60° C.

The pH of the aqueous solution may be 8.5 to 12 in view of the generation efficiency of nickel hydroxide, and it is preferably 9 to 12. According to the prior art techniques, such pH of the aqueous solution is controlled by adjusting an amount of supplied oxygen and powdered nickel as a raw material.

Such method of producing nickel hydroxide, however, has problems in that the amount of supplied oxygen and nickel must be adjusted in order to control pH of the solution and that physical control in terms of crystallinity, particle size, tap density and the like is difficult.

In view of the foregoing, the present invention intends to provide a method for producing nickel hydroxide which is capable of an easy pH control without substantially yielding waste water.

BRIEF SUMMARY OF THE INVENTION

The method for producing nickel hydroxide in accordance with the present invention comprises the steps of: adding and dissolving a powdered nickel into an aqueous solution containing an ammonium ion; and controlling pH of the aqueous solution by supplying a hydroxide ion generated by water electrolysis thereto to produce nickel hydroxide.

In this case, it is preferable to capture a hydrogen ion generated by the electrolysis by a cation exchange membrane.

Further, an amount of supplied hydroxide ion generated by the electrolysis can be controlled by an anion exchange membrane or an amount of current flowing in the electrolysis.

While the novel features of the invention are set forth particularly in the appended claims, the invention, both as to organization and content, will be better understood and appreciated, along with other objects and features thereof, from the following detailed description taken in conjunction with the drawing.

DETAILED DESCRIPTION OF THE INVENTION

Figure 1:
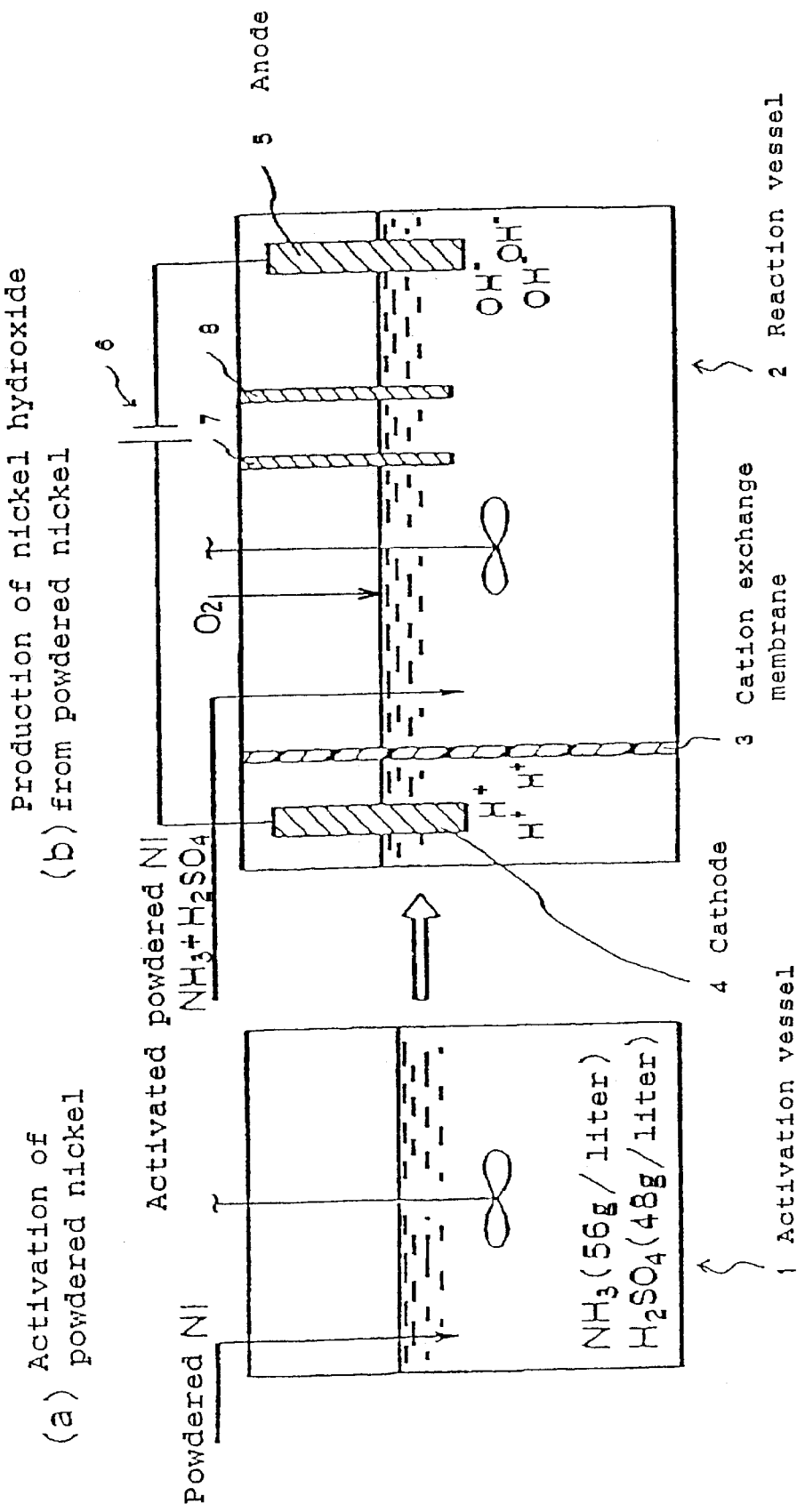
FIG. 1 is a conceptual view showing one example of a nickel hydroxide production apparatus for carrying out the method for producing nickel hydroxide in accordance with the present invention.

In the following paragraphs, preferred embodiment of the present invention will be described with referred to the attached drawing.

The method for producing nickel hydroxide in accordance with the present invention has improved the conventional method, in which nickel hydroxide is produced by adding and dissolving nickel metal (powdered one, in particular) into an aqueous solution containing an ammonium ion and controlling pH of the aqueous solution (i.e., resultant mixed solution), in order to solve the problems mentioned above.

The inventors of the present invention have noticed that generation reaction of nickel hydroxide can be facilitated by increasing an amount of hydroxide ion ($OH^-$) in the above-mentioned reaction formulae (1) to (3) and, as a resultant, completed the present invention.

Next, the water electrolysis for supplying hydroxide ion in the production method of nickel hydroxide in accordance with the invention will be explained, taking an example of the following embodiment and referring to a drawing.

According to the present invention, the pH of the aqueous solution after dissolving powdered metallic nickel described above is controlled by supplying the hydroxide ion generated by water electrolysis, not by controlling the amounts of supplied oxygen and powdered nickel, in the above-mentioned step (2) where oxygen is supplied.

FIG. 1 is one embodiment of nickel hydroxide production apparatus for carrying out the method of the present invention. The nickel hydroxide production apparatus mainly composed of an activation vessel 1 and a reaction vessel 2.

First, a powdered nickel is supplied at 24.1 kg/hr to the activation vessel 1 containing 62 g/l ammonium and 51 g/l sulfuric acid which is provided with a stirrer, to activate and dissolve the powdered nickel. It is preferable to keep pH of the aqueous solution at 10.2 to 10.3.

Next, the solution containing activated and dissolved powdered nickel is moved to the reaction vessel 2 provided with a stirrer, and oxygen is supplied at 70 ml/min.

A cathode 4 and an anode 5, which are connected to a direct current power source 6, are immersed in the above-mentioned solution of the reaction vessel 2. When this solution is provided with a current by the direct current power source 6, water electrolysis takes place in the solution, generating a hydrogen ion near the cathode 4 and a hydroxide ion near the anode 5.

In this step, the hydroxide ion facilitates the reaction represented by the formula (3), and the hydrogen ion generated near the cathode 4 is captured by a cation exchange membrane 3 which screens off or partitions off a part of the reaction vessel 2.

As the cation exchange membrane 3 used here, there is no special limitation and any conventional one may be used.

Cation exchange resin which can be used for the cation exchange membrane 3 is generally prepared by introducing cation exchange group to a co-polymer of methacrylic acid and divinylbenzen. As the cation exchange group, for example, sulfonic group, carboxyl group, phenolic hydroxyl group, phosphonic acid group and arsonic acid group may be used.

The cation exchange resin membrane 3 may be produced from such ion exchange resins by the conventional method.

The thickness and ion exchange ability of the cation exchange membrane 3 may have some range if appropriate capture of the hydrogen ion generated near the cathode 4 is possible without injuring the effects of the present invention.

In order to control an amount of hydroxide ion to be supplied, an amount of current flowing in the water electrolysis may be adjusted. Also, a part of the hydroxide ion generated near the anode 5 may be captured for this purpose by providing an anion exchange membrane near the anode 5, as the cation exchange membrane 3 is provided near the cathode 4.

Anion exchange resin used for this anion exchange membrane may also be made of any conventional ones, just like the above-mentioned cation exchange membrane.

Further, cobalt, zinc and the like to be incorporated and dissolved in a crystal of nickel hydroxide may be added to the reaction vessel 2. These cobalt and zinc are preferably in the form of metallic powder, but common compounds such as cobalt sulfate may also be used.

Furthermore, the reaction vessel 2 is preferably provided with an electric potential meter 7 for measuring the potential of the above-mentioned mixed solution and a pH measuring device 8 for measuring pH thereof.

As described above, the generation of nickel hydroxide can be facilitated by controlling the potential and pH in the reaction vessel 2.

The nickel hydroxide thus generated is contained in the above-mentioned mixed solution as a form of precipitation having magnetism, so it can be separated from the solution by means of magnetic separation, filteration and the like, to collect nickel hydroxide.

A filtrate which is left after the filteration may contain some remaining nickel hydroxide, so the filtrate may be again supplied to the reaction vessel 2 for the production of nickel hydroxide.

The method for producing nickel hydroxide in accordance with the present invention enables the production of nickel hydroxide without using solutions which are detrimental to the environment. Also, the method of the present invention makes it easy to control physical properties of nickel hydroxide obtained.

Although the present invention has been described in terms of the presently preferred embodiment, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A method for producing nickel hydroxide, comprising the steps of: adding and dissolving a powdered nickel into an aqueous solution containing an ammonium ion; and controlling the pH of said aqueous solution by supplying a hydroxide ion generated by water electrolysis to produce nickel hydroxide in said aqueous solution.

2. The method for producing nickel hydroxide in accordance with claim 1, further comprising the step of capturing a hydrogen ion generated by said electrolysis by a cation exchange membrane.

3. The method for producing nickel hydroxide in accordance with claim 1, further comprising the step of controlling an amount of said supplied hydroxide ion by an anion exchange membrane or an amount of current flowing in the electrolysis.

* * * * *

UNITED STATES PATENT AND TRADEMARK OFFICE
CERTIFICATE OF CORRECTION

PATENT NO.    : 6,340,453 B1
DATED         : January 22, 2002
INVENTOR(S)   : Hayashi et al.

It is certified that error appears in the above-identified patent and that said Letters Patent is hereby corrected as shown below:

<u>Title page,</u>
Item [*] Notice, delete the phrase "by 0 days" and insert -- by 13 days --

Signed and Sealed this

Twenty-eighth Day of September, 2004

JON W. DUDAS
*Director of the United States Patent and Trademark Office*